(12) United States Patent
Wolbank et al.

(10) Patent No.: US 10,468,999 B2
(45) Date of Patent: Nov. 5, 2019

(54) METHOD FOR DETECTING LOAD DIFFERENCES

(71) Applicant: BOMBARDIER TRANSPORTATION GMBH, Berlin (DE)

(72) Inventors: Thomas Wolbank, Vienna (AT);
Martin Bazant, Maennedorf (CH);
Markus Vogelsberger, Trins (AT)

(73) Assignee: BOMBARDIER TRANSPORTATION GMBH, Berlin (DE)

( * ) Notice: Subject to any disclaimer, the term of this patent is extended or adjusted under 35 U.S.C. 154(b) by 0 days.

(21) Appl. No.: 16/022,417

(22) Filed: Jun. 28, 2018

(65) Prior Publication Data

US 2019/0006967 A1    Jan. 3, 2019

(30) Foreign Application Priority Data

Jun. 29, 2017  (EP) ..................... 17178588

(51) Int. Cl.
*H02P 5/74*  (2006.01)
*H02P 6/04*  (2016.01)
(Continued)

(52) U.S. Cl.
CPC .................. *H02P 5/74* (2013.01); *H02P 6/04* (2013.01); *H02P 25/022* (2013.01);
(Continued)

(58) Field of Classification Search
CPC ...... H02P 1/00; H02P 1/04; H02P 1/16; H02P 1/24; H02P 1/26; H02P 1/423; H02P 1/46; H02P 5/00; H02P 6/00; H02P 6/005; H02P 6/008; H02P 6/04; H02P 6/08; H02P 6/12; H02P 6/186; H02P 21/00; H02P 21/0035;
(Continued)

(56) References Cited

U.S. PATENT DOCUMENTS

| 4,298,831 | A | 11/1981 | Espelage et al. |
| 7,180,259 | B2 * | 2/2007 | Matsumoto ............... H02P 5/74 |
| | | | 318/432 |

(Continued)

FOREIGN PATENT DOCUMENTS

| JP | 2002112404 A | 4/2002 |
| JP | 2011072062 A | 4/2011 |

*Primary Examiner* — Antony M Paul
(74) *Attorney, Agent, or Firm* — McCoy Russell LLP (57) ABSTRACT

Method for detecting load differences between at least one first electrical machine and at least one second electrical machine connected in parallel thereto, which are fed by an inverter, wherein the machines each are connected to the inverter via three supply lines and in two supply lines of the at least one first machine and in one of the supply lines of the at least one second machine, the currents are measured with the aid of current measuring sensors in the respective supply lines and, on the basis of the measured current values of the at least one first machine, the corresponding unmeasured currents of the at least one second machine are estimated, and the estimated total current of the supply lines of the at least one second machine is detected as a measure of deviation of the currents of the at least one second machine from the at least one first machine.

11 Claims, 3 Drawing Sheets

(51) Int. Cl.
*H02P 25/022* (2016.01)
*H02P 29/024* (2016.01)
*H02P 25/024* (2016.01)

(52) U.S. Cl.
CPC .......... *H02P 25/024* (2016.02); *H02P 29/024* (2013.01); *H02P 29/0241* (2016.02)

(58) Field of Classification Search
CPC ........ H02P 21/148; H02P 23/00; H02P 23/14; H02P 25/021; H02P 27/00; H02P 27/04; H02P 27/06; H02P 21/14; H02P 21/22; H02P 6/28
USPC .... 318/400.01, 400.02, 400.14, 400.15, 700, 318/701, 721, 727, 799, 800, 801, 430
See application file for complete search history.

(56) References Cited

U.S. PATENT DOCUMENTS

| | | |
|---|---|---|
| 2006/0012322 A1 | 1/2006 | Matsumoto et al. |
| 2007/0273310 A1 | 11/2007 | Foch et al. |
| 2009/0309529 A1 | 12/2009 | Shoda et al. |

\* cited by examiner

METHOD FOR DETECTING LOAD DIFFERENCES

CROSS-REFERENCE TO RELATED APPLICATION

This application claims priority to European Application No. 17178588.4 entitled "METHOD FOR DETECTING LOAD DIFFERENCES," filed on Jun. 29, 2017, the entire contents of which is hereby incorporated by reference in its entirety for all purposes.

TECHNICAL FIELD

The present disclosure relates to a method for detecting load differences between at least one first electrical machine and at least one second electrical machine connected in parallel thereto, which are fed by an inverter, the machines each being connected to the inverter via three supply lines.

Further, the present disclosure relates to a device for detecting load differences between parallel electrical machines comprising three first supply lines to at least one first machine and three further supply lines to at least one second machine.

BACKGROUND AND SUMMARY

In many applications of electrical machines comprising an inverter, current measuring sensors are required in the supply lines, in order to be capable of correctly detecting the current operating condition of the machine. For example, when controlling an asynchronous machine connected to an inverter, current measuring sensors are used in the individual supply lines, which make the measured current values available to a control device. It is thus possible to draw conclusions about the current operating condition of the machine to be controlled and to react accordingly to changes during the operation of the asynchronous machine. If three supply lines to the asynchronous machine are used, three current measuring sensors are required. It is known that by applying the Kirchhoff's junction rule one of the current measuring sensors may be saved without having to accept a loss of information about the currents in the supply lines, thus not only being capable of eliminating possible sources of errors but also of reducing costs.

If several electrical machines are operated in parallel on a common inverter, they may partially be exposed to different loads and therefore have deviating operating conditions. For a specific control it is therefore essential to determine or at least estimate the deviations between the individual machines.

The power supply of several drives with a common inverter is also referred to as "group drive" or "multi motor" in some citations. This concept is used, among other things, in tramways or trains and is constantly being further developed.

For example, the US 2009/0309529 A1 shows a system for operating several parallel (linear) motors, each of which has 3 supply lines. Current measuring sensors are arranged in each two of the supply lines to be able to determine the operating conditions of the individual motors and protect them from overload. For the actual control of the motors, however, other current measuring sensors are provided, which measure the total currents in the supply lines prior to the distribution to the individual motors.

The US 2006/0012322 A1 discloses a drive device for operating several parallel asynchronous machines (ASM) on an inverter. Current measuring sensors are provided in the common supply lines of the ASM, whose measured values can be used to determine a deviation measure for detecting load differences between the individual ASM. In addition, corresponding control measures are also proposed on the basis of this deviation measure.

The U.S. Pat. No. 4,298,831 also shows a device for the control of several parallel ASM, whereby current sensors are arranged in each one of the individual supply lines of the ASM.

The patent specification JP 2002112404A discloses several variants for controlling parallel ASM. An embodiment relates to the arrangement of current sensors in the same phases of several ASM, whereby different loads of the machines can be determined by comparing the measured current values.

The JP 2011 072062 A discloses an interconnection of at least two permanent-magnet-excited synchronous machines in BLDC mode, which are operated on a common inverter. The current sum of two supply currents of the first synchronous machine and of a supply line current of the second synchronous machine is determined with the aid of a total current transformer, in order to be able to detect any failures of the synchronous machines during operation with the aid of the sign of the current sum. The disadvantage of JP 2011 072062 A, however, is that no information is available on the operating conditions of the individual synchronous machines, so that no current space phasor can be calculated and no vector control or field-oriented control can be used. Furthermore, in the JP 2011 072062 A, due to the lack of information on the currents in the individual supply lines, no reference value can be determined, with which the total current ascertained could be related, in order to determine a relative deviation between the individual machines.

In addition, from US 2007/273310 A1 a parallel connection of two electrical machines on a common inverter is known, wherein current measuring sensors are inserted in at least two supply lines of each machine. It is a disadvantage that the number of current measuring sensors increases with the number of machines used.

A disadvantage of the conventional art is the high number of current measuring sensors required, which are arranged in three or two motor supply lines in a frequently found variant. Thus, the number of current measuring sensors increases proportionally to the number of drives and the factor 2 or 3 with this arrangement of sensors. However, each additional current measuring sensor involves the danger of a potential source of errors and also causes additional costs which must be avoided.

On the other hand, in the variant of current measuring sensors in the common supply lines to several electrical machines, it is not possible to make more precise statements about the condition of the individual machines, since only a kind of average information of all machines is available. Although current measuring sensors can be saved thereby, this is done at the expense of the usable information.

In addition, in the case of current sensors being arranged in the same phases (e.g. JP 2002112404A) of several parallel machines, it is not possible to control them specifically or to determine the operating condition of individual machines, since only measured values are compared, but no sufficient information is obtained that might be used as the basis of an exact control.

In contrast, it is the object of the present disclosure to remove or reduce at least individual disadvantages of the conventional art. The present disclosure aims at providing a method or a device of the type mentioned above, which allows current sensors to be saved, without resulting in any greater loss of information.

According to the present disclosure it is provided that in two supply lines of the at least one first machine and in one of the supply lines of the at least one second machine, the currents are measured with the aid of current measuring sensors in the respective supply lines and, on the basis of the measured current values of the at least one first machine, the corresponding unmeasured currents of the at least one second machine are estimated, and in that the estimated total current of the supply lines of the at least one second machine is determined (or recorded) as a measure of deviation of the currents of the at least one second machine from the at least one first machine.

The method according to the present disclosure is therefore based on the assumption that the same currents flow in the unmeasured supply lines of the at least one second machine as in the corresponding supply lines of the at least one first machine. "Corresponding" in this context means "the same supply line/phase". For small deviations of the load, this estimate will be accurate in good approximation.

Three winding strands or supply lines to an electrical machine may be designated U, V and W and added to the electrical quantities for differentiation as a subscript. In order to be able to distinguish the electrical values of the at least one first machine from the electrical values of the at least one second machine, index 1 or 2 is also used. Furthermore, estimated magnitudes are marked with a roof sign. The estimated current in the supply line U to the at least one second machine, for example, is therefore called $\hat{I}_{U2}$. Below, calculation is also performed in related quantities. If therefore the nominal current flows in a supply line, the current has the value 1.

The electrical machines used can be asynchronous machines. The currents in the supply lines of the at least one first machine may be determined accurately with only two current measuring sensors, since what applies is the relationship $$I_{U1}+I_{V1}+I_{W1}=0$$

In which two of the three supply lines of the at least one first machine the current measuring sensors are arranged is irrelevant due to the above relationship. Since the currents are known in the corresponding supply lines of the at least one first machine, one current measuring sensor can be inserted in each supply line of the at least one second machine without restricting the method. The two missing currents in the supply lines of the at least one second machine can be estimated at any time, since the corresponding currents of the at least one first machine are known.

By estimating the unmeasured currents in the supply lines of the at least one second machine, statements can be made about the condition of the at least one second electrical machine. Thus, when measuring the current in the supply line W of the at least one second machine, by forming the total current $$\hat{I}_{U2}+\hat{I}_{V2}+I_{W2}=\delta,$$

The measure of deviation can be determined, with $\hat{I}_{U2}=I_{U1}$ and $\hat{I}_{V2}=I_{V1}$ applying. The currents in the supply lines U and V of the at least one second machine are thus estimated by the currents in the supply lines U and V of the at least one first machine. Of course, the current measuring sensor can be arranged in any supply line of the at least one second machine. One advantage of the method disclosed is that the determined measure of deviation $\delta$ can be related to the measured currents, whereby a relative measure of deviation can be determined, which reflects the relative deviation between the at least one first electrical machine and the at least one second electrical machine. In addition, on the basis of the available information such as measured currents in the supply lines of the at least one first machine, a control system for the electrical machines can already be used.

If now the estimated currents correspond to the actual currents, i.e. $\hat{I}_{U2}=I_{U2}$ and $\hat{I}_{V2}=I_{V2}$, the measure of deviation is $\delta=0$. This case usually occurs with the same load of the machines. However, if the estimated currents differ from the actual currents, then the measure of deviation $\delta$ is a positive or negative number, depending on whether the at least one second machine is loaded to a greater or lesser extent. In any case, the measure of deviation $\delta$ is no longer zero.

Furthermore, a first current space phasor may be determined from the measured currents in the supply lines of the at least one first machine and a second current space phasor is determined from the measured current in the supply lines of the at least one second machine and the estimate for the two currents that have not been measured. This makes it possible to use a suitable control based on a space phasor representation. The current space phasors may be calculated according to the following formula:

$$i=\tfrac{2}{3}(I_U+I_V*e^{j120°}+I_W*e^{j240°}).$$

The first and second current space phasors are designated $i_1$ and $i_2$ respectively. The first current space phasor $i_1$ can be determined from measured or calculated values $I_{U1}$, $I_{V1}$ and $I_{W1}$ to $i_1=\tfrac{2}{3}(I_{U1}+I_{V1}*e^{j120°}+I_{W1}*e^{j240°})$. The second current space phasor is calculated again to $i_2=\tfrac{2}{3}(\hat{I}_{U2}+\hat{I}_{V2}*e^{j120°}+I_{W2}*e^{j240°})$. Again, it was assumed that the one current measuring sensor is arranged in the supply line W of the at least one second machine, and the currents in the supply lines U and V are estimated. With the two current space phasors $i_1$ and $i_2$, various control methods known from the literature can be used.

In addition, it is possible that a torque $\tau$ of the at least one second machine is estimated on the basis of the second current space phasor. This is possible with known formulas for the torque of an electrical machine, for example $\tau=\text{IM}\{\Psi \; i_2{}^*\}$. This requires other knowledge of the machine, such as the flux linkage space phasor. Their determination or calculation is also already known from the literature.

Furthermore, a torque of the at least one first machine can be calculated on the basis of the first current space phasor. Since the current space phasor $i_1$ is calculated and not estimated, it is also possible to calculate the torque of the at least one first machine.

A measure of deviation of the currents of the at least one second machine from the at least one first machine is determined from the phase and/or magnitude difference between the first current space phasor and the second current space phasor and allows for better determination of deviations of the at least one first machine from the at least one second machine. If the estimated current values $\hat{I}_{U2}$ and $\hat{I}_{V2}$ correspond to the actual current values, the two current space phasors $i_1$ and $i_2$ have the same magnitude and the same phase. If the measure of deviation measure is $\delta\neq0$, there may be a difference in the magnitude and phase of the first current space phasor to the second current space phasor. The phase and/or magnitude differences therefore constitute an additional measure of deviation of the currents of the at least one second machine from the at least one first machine. For example, depending on the application, a threshold value could be defined, as of which a control takes a corrective action and counteracts a deviation of the two machines. Such a threshold value would be, for example, a 10-percent deviation of the magnitude of the two current space phasors $i_1$ and $i_2$. However, the specific value depends on the application. However, a threshold value based on the phase or, respectively, the magnitude and the phase would also be conceivable.

Furthermore, by applying voltage steps $\Delta U$ in the supply lines current changes occur, which current changes are detected by the current measuring sensors, and a winding resistance may be determined with the aid of the measured corresponding current changes. The voltage steps $\Delta U$ in the supply lines cause changed currents in the supply lines, which can be detected with the current measuring sensors. After transient effects (caused for example by inductances) have subsided, a current step $\Delta I$ can be determined. Therefore, the winding resistance may be calculated by quotient formation of the voltage step and the current step of a supply line according to Ohm's law. For the voltage and current jumps, the differential voltages and residual currents before and after the steps and after the decrease of transient effects are used.

Furthermore, the operating conditions of the machines can be determined, if the temperature in the windings may be calculated by using a temperature-dependent resistance model. For example, if a linear temperature model of the form $$R \approx R_0 + (T-T_0)*\alpha$$

is used, the temperature T in the windings can be determined if the resistance $R_0$ at temperature $T_0$, the temperature coefficient $\alpha$ and the determined resistance R are known.

To obtain additional information about the machine condition, an inductance can be determined by applying a voltage in the supply lines in which current measuring sensors are arranged and by measuring the current slope of the corresponding currents. For this purpose, voltage steps $\Delta U$ in the supply lines can be used again. If the current slope of a supply line is used immediately after the voltage step $\Delta U$ in the supply line, the inductance can be determined, neglecting the resistance. Depending on the position of the rotor, the inductance of a machine has different values due to slotting effects.

Furthermore, a change in the position of the rotor, such as a standstill, can be determined on the basis of the determined inductance. When the rotor does not rotate, the determined inductance remains the same. This means that a standstill can also be detected on the at least one second machine. If the same current increase is registered in several measurements on the at least one second machine in the measured supply line, it may be assumed that the rotor is stationary.

The device of the type mentioned above comprises current measuring sensors arranged in two of the first supply lines and in one of the further supply lines, wherein an estimating unit is connected to the current measuring sensors and designed for estimating the undetected currents in the further supply lines on the basis of the corresponding measured current values of the first supply lines. For example, the estimation unit may be available as an independent component in the form of a microprocessor or be integrated into other components.

BRIEF DESCRIPTION OF THE DRAWINGS

The present disclosure will be explained in detail below using embodiments, however, to which it should not be limited. The Figures show in detail.

DETAILED DESCRIPTION

Figure 1:
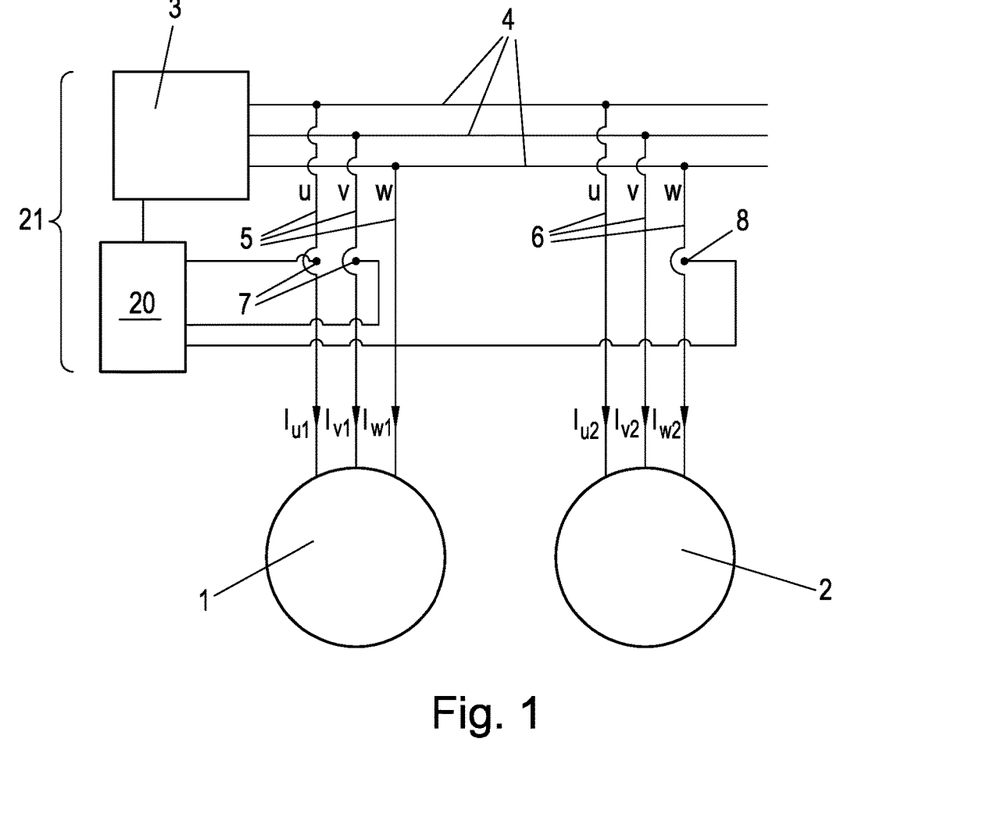
FIG. 1 an arrangement of two parallel electrical machines on an inverter.

FIG. 1 shows a first electrical machine 1 and a second electrical machine 2, which are fed by a common inverter 3. The inverter 3 comprises three inverter output lines 4. The first machine 1 and the second machine 2 are connected to the inverter output lines 4 and thus to the inverter 3 via three supply lines 5 and 6, respectively. In two of the supply lines 5 of the first machine 1, in this case in the supply lines U and V, two current measuring sensors 7 are arranged, which measure the currents in the two supply lines. In one of the supply lines 6 of the second machine 2, in this case in the supply line W, an additional current measuring sensor 8 is arranged. At this point, it should be mentioned once again that the current measuring sensors 7 may be arranged in any way in the supply lines 5 of the first machine 1 and that the sensor 8 may be arranged in any way in the supply lines 6 of the second machine 2. The current measuring sensors 7, 8 are connected to a controller 20, which is further connected to the inverter 3. Together the current measuring sensors 7, 8, the controller 20 and the inverter 3 form a control system 21 monitoring and controlling the operation of the electrical machines 1, 2.

Below, an exemplary operation will be presented, by means of which the method according to the present disclosure will be explained in more detail. First, it is assumed that the first machine 1 and the second machine 2 are loaded equally at a time $t=T_1$. The inverter 3 applies voltages to the output according to a specification, and currents flow in the supply lines 5 and 6. At time $t=T_1$ the currents $I_{U1}=I_{U2}=1$, $I_{V1}=I_{V2}=-0.5$ and $I_{W1}=I_{W2}=-0.5$ flow in the supply lines 5 and 6. The currents $I_{U1}$ and $I_{V1}$ are measured with the current measuring sensors 7, from which the current $I_{W1}$ can be determined with the aid of $I_{U1}+I_{V1}+I_{W1}=0$. The current $I_{W2}$ can be measured with the current measuring sensor 8.

On the basis of the measured current values $I_{U1}$ and $I_{V1}$ of at least one first machine 1, the corresponding unmeasured currents $\hat{I}_{U2}$ and $\hat{I}_{V2}$ of at least one second machine 2 are estimated. Estimated quantities are provided with a roof sign. "Corresponding" in this context means "the same supply line/phase". In the present example, it is assumed that at time $t=T_1$ the currents $\hat{I}_{U2}=I_{U1}=1$ and $\hat{I}_{V2}=I_{V1}=-0.5$ flow in the unmeasured supply lines U and V of the supply lines 6 of the second machine 2. Subsequently, a measure of deviation $\delta$ is formed, which is calculated from an estimated total current $\hat{I}_{U2}+\hat{I}_{V2}+I_{W2}$ to $\hat{I}_{U2}+\hat{I}_{V2}+I_{W2}=\delta$. At the selected time $\delta=0$ is calculated, since the currents in the corresponding supply lines are the same.

At another time $t=T_2$ the currents $I_{U1}=1$, $I_{V1}=-0.5$ and $I_{W1}=-0.5$ flow in the supply lines 5 of the first machine 1 and the currents $I_{U2}=1.2$, $I_{V2}=-0.6$ and $I_{W2}=-0.6$ flow in the supply lines 6 of the second machine 2 in case of unequal load of the machines. The measure of deviation is therefore calculated as δ=−0.1. It can be concluded from this that the machines are loaded differently at time t=$T_2$. With this information, control related actions can now be taken, such as they are known from the literature.

Figure 2:
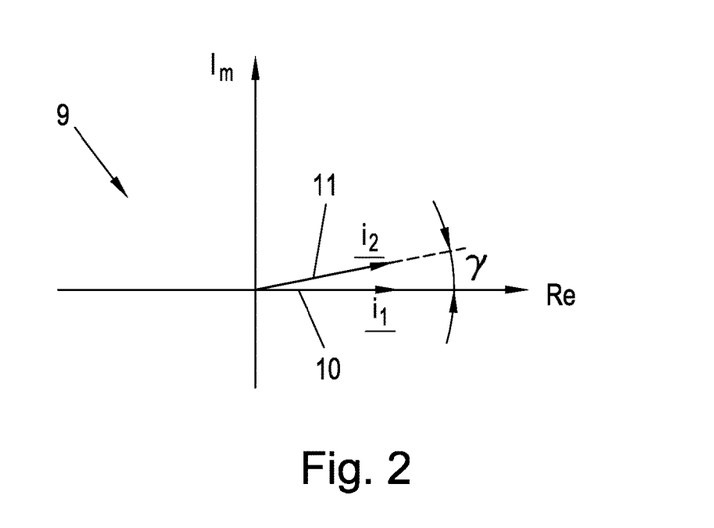
FIG. 2 a coordinate system comprising two current space phasors corresponding to the first and second current space phasor.

In FIG. 2 a coordinate system 9 is shown with a real axis and an imaginary axis. In an embodiment, the measured currents in the supply lines 5 of the at least one first machine 1 are converted into a first current space phasor 10 according to $$i_1 = \tfrac{2}{3}(I_{U1} + I_{V1} * e^{j120°} + I_{W1} * e^{j240°}).$$

A second current space phasor 11 is determined from the measured current $I_{W2}$ in the supply lines 6 of the at least one second machine 2 and the estimation $\hat{I}_{U2}$ and $\hat{I}_{V2}$ for the two unmeasured currents according to $$i_2 = \tfrac{2}{3}(\hat{I}_{U2} + \hat{I}_{V2} * e^{j120°} + I_{W2} * e^{j240°}).$$

These are shown in the coordinate system 9 with the magnitude and the phase. With the above values at time t=$T_2$ one can see from FIG. 2 that the first current space phasor 10 differs from the second current space phasor in magnitude and phase. At time t=$T_1$ the second current space phasor 11 would be identical in magnitude and phase with the first current space phasor 10, and these current space phasors 10, 11 would therefore be superimposed in the coordinate system 9. With the help of the second current space phasor $i_2$ a torque $\tau_2$ of the second machine 2 can be estimated. In addition, a torque $\tau_1$ of the first machine 1 can be calculated with the first current space phasor $i_1$.

Whenever the first current space phasor 10 and the second current space phasor 11 have been determined, a measure of deviation of the currents of the first machine to the currents of the second machine can be determined from the phase and/or magnitude difference of the first current space phasor 10 to the second current space phasor 11. This means that the magnitude and phase difference can be used directly as a measure of deviation. This provides a second measure of deviation characterizing the load differences of the machines. If the magnitude and phase of the first current space phasor 10 and the second current space phasor 11 coincide, the first machine 1 and the second machine 2 are equally loaded.

Figure 3:
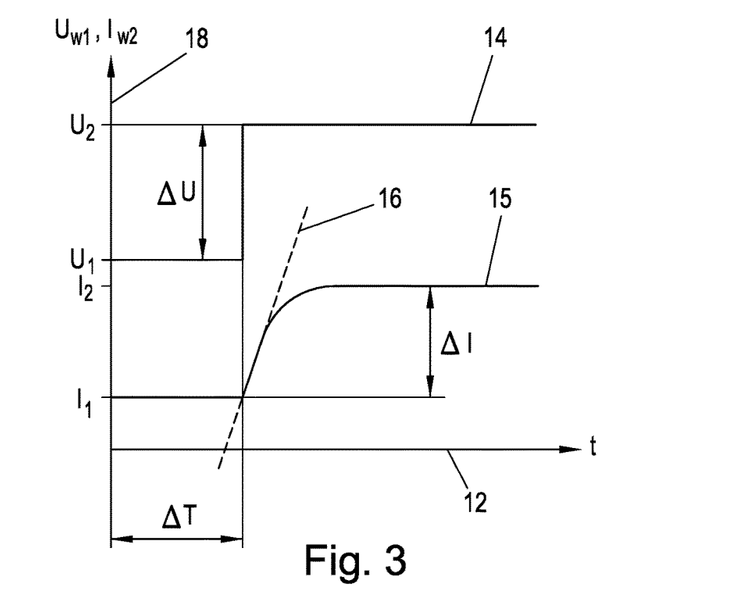
FIG. 3 a voltage curve and a current curve to determine the winding resistance.

FIG. 3 shows a diagram to illustrate the determination of winding resistance. The abscissa represents a time axis 12 and the ordinate represents a common axis 13 for current I and voltage U of the supply line or phase W of the machine 2. The diagram shows an exemplary voltage curve 14 with a voltage step ΔU and an exemplary current curve 15 with a current step ΔI of the supply line W of the second machine 2. Such a voltage curve occurs when a voltage space phasor $u_1$ is switched to another voltage space phasor $u_2$. The voltage space phasors are applied by the inverter 3 and may be calculated in accordance with $$u = \tfrac{2}{3}(U_U + U_V * e^{j120°} + U_W * e^{j240°})$$

The voltage space phasor $u_1$ causes a current in the individual supply lines, which is detected by the current measuring sensors 7 and 8 in the respective supply lines. The current curve 15 of the supply line W of the second machine 2 shown in FIG. 3 is measured by means of the current measuring sensor 8. After time ΔT in this example, a voltage step ΔU occurs by switching the voltage space phasor from $u_1$ to $u_2$ in jumps. By applying the new voltage space phasor $u_2$, the voltage U of the supply line/phase W of machine 2 is also changed from a voltage $U_1$ to a voltage $U_2$, where ΔU=$U_2$−$U_1$ applies. As a result, the current $I_W$ in the supply line W also changes approximately abruptly in accordance with the current curve 15. After transient effects have subsided, the current step ΔI is determined and the winding resistance $R_{2W}$ of phase W of the second machine 2 is determined by $$R_{W2} = \Delta U / \Delta I.$$

Only the differences in voltages and currents, i.e. the steps ΔU and ΔI were used. The determination of the winding resistance can be determined by analogy in the supply lines, in which the currents can also be measured or calculated. This is possible for the three supply lines 5 of the first machine 1 and in the supply line of the second machine 2, in which the current measuring sensor 8 is arranged. In this example, this is the supply line W.

If a winding resistance is known, the temperature in the winding can be determined by using a temperature-dependent resistance model. For example, if a linear model of the form $R_{2W} \approx R_0 + (T-T_0) * \alpha$ is used, a conclusion can be drawn as to the temperature T in the winding W of the second machine 2 by means of converting the equation, if the resistance $R_0$ at the temperature $T_0$ and the temperature coefficient α are known. A temperature model of a higher order can also be used.

FIG. 3 also shows that the current step is not instantaneous, but shows an initial current slope 16. This current slope 16 is due to an inductance of the second machine 2. Of course, this applies to the machines used. The inductance can be determined with the aid of the current step 16. This is done according to the equation ΔU≈L*dI/dt, where L represents the inductance and dI/dt the current slope 16. If the current slope 16 immediately following the voltage step ΔU is used, the winding resistance R can be neglected, since the current $I_{W2}$ remains almost constant at the time ΔT immediately after the voltage jump ΔU and the entire voltage ΔU drops at the inductance. The inductance is therefore calculated from $$L \approx \Delta U / (dI/dt).$$

When the rotor of a machine rotates, the inductance changes. In the case of an asynchronous machine, for example, this is due to the slotting effects. If the rotor is stationary, however, the inductance remains constant. This makes it possible to determine a change in the position of the rotor, such as a standstill, on the basis of the determined inductance. If the inductance of phase W of the second machine is determined with the aid of the current slope 16 and the voltage step ΔU, a rotor standstill can be reliably detected, if it remains constant.

Figure 4:
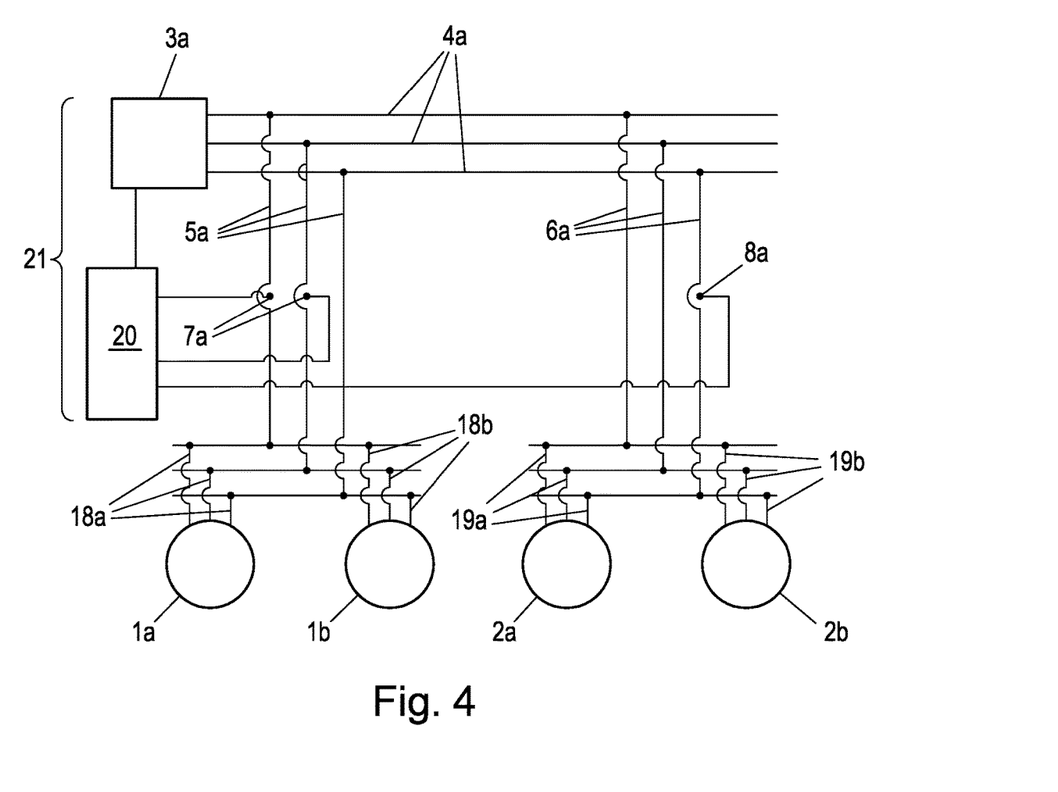
FIG. 4 shows an extension of the method according to the present disclosure and the device according to the present disclosure

FIG. 4 shows a further development of the present method and the present device. Two first machines 1a and 1b and two second machines 2a and 2b are provided. The machines are fed by an inverter 3a. The first machines 1a and 1b are connected in parallel and are supplied by supply lines 5a. A current measuring sensor 7a is arranged in two of the supply lines 5a. The supply lines 5a are divided into machine supply lines 18a and 18b downstream (i.e. toward the loads) of the current measuring sensors 7a. The second machines 2a and 2b are also connected in parallel and are supplied via supply lines 6a. A current measuring sensor 8a is arranged in one of the supply lines 6a. The supply lines 6a are divided into machine supply lines 19a and 19b downstream of the current measuring sensor 8a. The supply lines 5a and 6a are connected to the inverter 3a via inverter output lines 4a. The currents $I_{1U}$ and $I_{1V}$ can be measured with the aid of the current measuring sensors 7a. From equation $I_{U1}+I_{V1}+I_{W1}=0$ the current $I_{1W}$ can be determined. On the basis of the currents determined in this way in the supply lines 5a, the unmeasured currents in the supply lines 6a can be estimated, as is also the case with the embodiment according to FIG. 1. As a result, a measure of deviation δ can also be determined, which is calculated according to $\hat{I}_{U2}+\hat{I}_{V2}+I_{W2}=\delta$. Of course, here the arrangement of the current measuring sensors 7a and 8a in the supply lines 5a and 6a is also arbitrary, without restricting the method. Since the splitting of the supply lines 5a and 6a into the machine supply lines 18a, b and 19a, b is effected downstream of the current measuring sensors 7a and 8a, the measured currents represent average values of the first machines and the second machines, respectively. Therefore, the estimates $\hat{I}_{U2}$ and $\hat{I}_{V2}$, in this case the estimates for the supply lines U and V of the second machines 2a and 2b, are also average values of the second machines 2a and 2b. The current measuring sensors 7a, 8a are connected to a controller 20, which is further connected to the inverter 3a. Together the current measuring sensors 7a, 8a, the controller 20 and the inverter 3a form a control system 21. The illustrations and method steps described in FIGS. 1 to 3 may now be applied analogously to the extended arrangement according to FIG. 4. Of course, it is also possible to use more than two first machines 1a and 1b or more than two second machines 2a and 2b. The described methods are still applicable.

Figure 5:
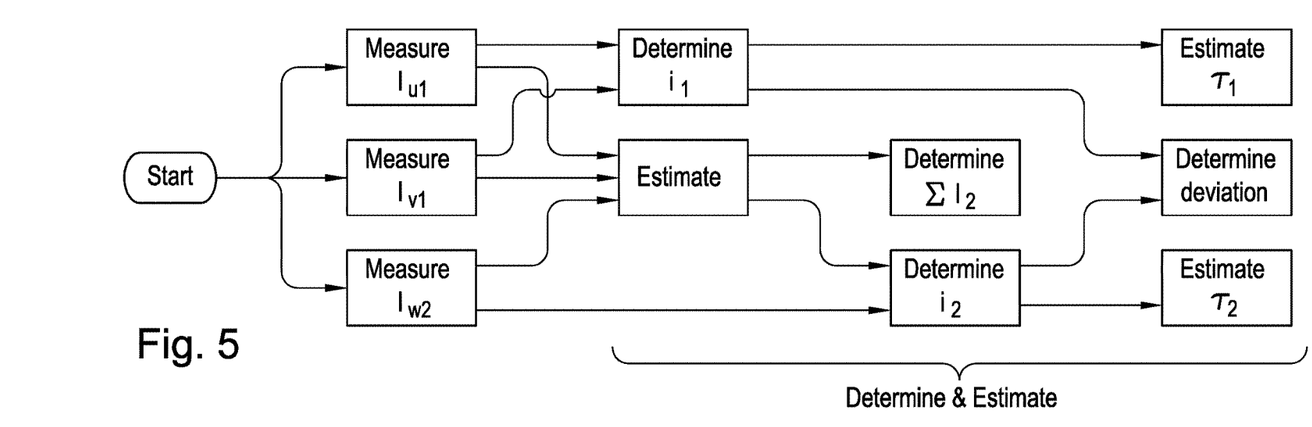
FIG. 5 shows a flow chart of a first embodiment of the present method.

The flow chart in FIG. 5 shows a method comprising measuring actions Measure $I_{U1}$, Measure $I_{V1}$ and Measure $I_{W2}$, indicating the steps of measuring the currents in two supply lines of the at least one first machine and in one of the supply lines of the at least one second machine with current measuring sensors in the respective supply lines. The Estimate action indicates the subsequent estimating of the corresponding unmeasured currents of the at least one second machine on the basis of the measured current values of the at least one first machine. The Determine $\Sigma I_2$ actions represent the step of determining the estimated total current of the supply lines of the at least one second machine as a measure of deviation of the currents of the at least one second machine from the at least one first machine. As shown by the Determine $i_1$ action, the method comprises determining a first current space phasor $i_1$ from the measured currents in the supply lines of the at least one first machine; the Determine $i_2$ action indicates determining a second current space phasor $i_2$ from the measured current in the supply lines of the at least one second machine and the estimate of the Estimate action for the two currents that have not been measured. Based on the two current space phasors $i_1$, $i_2$, a torque $\tau_2$ of the at least one second machine 2 is estimated in on the basis of the second current space phasor $i_2$ in Estimate $\tau_2$ and a torque $\tau_1$ of the at least one first machine 1 is calculated in Calculate $\tau_1$ on the basis of the first current space phasor $i_1$. Finally, a measure of deviation of the currents of the at least one second machine 2 from the at least one first machine 1 is determined in Determine deviation from the phase difference and/or magnitude difference between the first current space phasor $i_1$ and the second current space phasor $i_2$.

Figure 6:
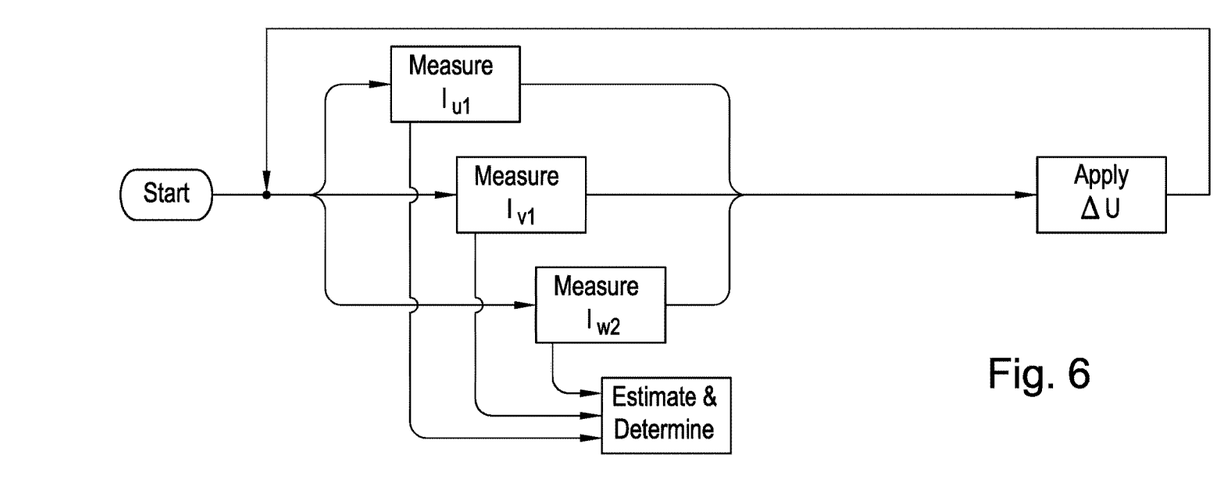
FIG. 6 shows a flow chart of a second embodiment of the present method.

The flow chart in FIG. 6 comprises similar measuring actions as the flow chart of FIG. 5 and summarizes the different estimating and determining actions shown in detail in FIG. 5 in a single general action "Estimate & Determined" as indicated by the curly bracket in FIG. 5. Moreover, subsequent to the measuring actions, one or more voltage steps ΔU are applied during Apply ΔU in the supply lines to effectuate current changes. Said current changes are detected with the current measuring sensors by repeating the Measure actions. The Estimate & Determine action includes various method steps that are not separately indicated in FIG. 6 for simplicity but summarized under the general Estimate & Determine action. For example, the Estimate & Determine action includes determining a winding resistance on the basis of the current changes corresponding to the applied voltage steps ΔU. It may also include calculating the temperature in the windings using a temperature-dependent resistance model. The Estimate & Determine steps can also include measuring the current slope of the corresponding currents and determining an inductance therefrom. Finally, they include determining a change in the position of the rotor on the basis of the determined inductance.

The invention claimed is:

1. A method for detecting load differences between at least one first electrical machine and at least one second electrical machine connected in parallel thereto, the machines each being connected to an inverter via three supply lines, including:
    measuring the currents in two supply lines of the at least one first machine and in one of the supply lines of the at least one second machine with current measuring sensors in the respective supply lines,
    estimating the corresponding unmeasured currents of the at least one second machine on the basis of the measured current values of the at least one first machine, and
    determining the estimated total current of the supply lines of the at least one second machine as a measure of deviation of the currents of the at least one second machine from the at least one first machine.

2. The method according to claim 1, further including determining a first current space phasor from the measured currents in the supply lines of the at least one first machine and determining a second current space phasor from the measured current in the supply lines of the at least one second machine and the estimate for the two currents that have not been measured.

3. The method according to claim 2, further including estimating a torque of the at least one second machine on the basis of the second current space phasor.

4. The method according to claim 3, further including calculating a torque of the at least one first machine on the basis of the first current space phasor.

5. The method according to claim 2, further including determining a measure of deviation of the currents of the at least one second machine from the at least one first machine from the phase difference and/or magnitude difference between the first current space phasor and the second current space phasor.

6. The method according to claim 1, further including applying voltage steps ΔU in the supply lines to effectuate current changes, detecting said current changes with the current measuring sensors, and determining a winding resistance on the basis of the measured corresponding current changes.

7. The method according to claim 6, further including calculating the temperature in the windings using a temperature-dependent resistance model.

8. The method according to claim 1, including determining an inductance by applying a voltage in the supply lines in which current measuring sensors are arranged and by measuring the current slope of the corresponding currents.

9. The method according to claim 8, including determining a change in the position of the rotor on the basis of the determined inductance.

10. A device for detecting load differences between parallel electrical machines comprising three first supply lines to at least one first machine and three further supply lines to at least one second machine, wherein current measuring sensors are arranged in two of the first supply lines and in one of the further supply lines, and an estimating unit is connected to the current measuring sensors and estimates the undetected currents in the further supply lines on the basis of the corresponding measured current values of the first supply lines.

11. The device according to claim 10, wherein the at least one first machine and the at least one second machine are asynchronous machines.

* * * * *